Jan. 27, 1959  S. E. RINN  2,870,901
CALL SERVICE CONVEYOR
Filed Dec. 19, 1955  2 Sheets-Sheet 1
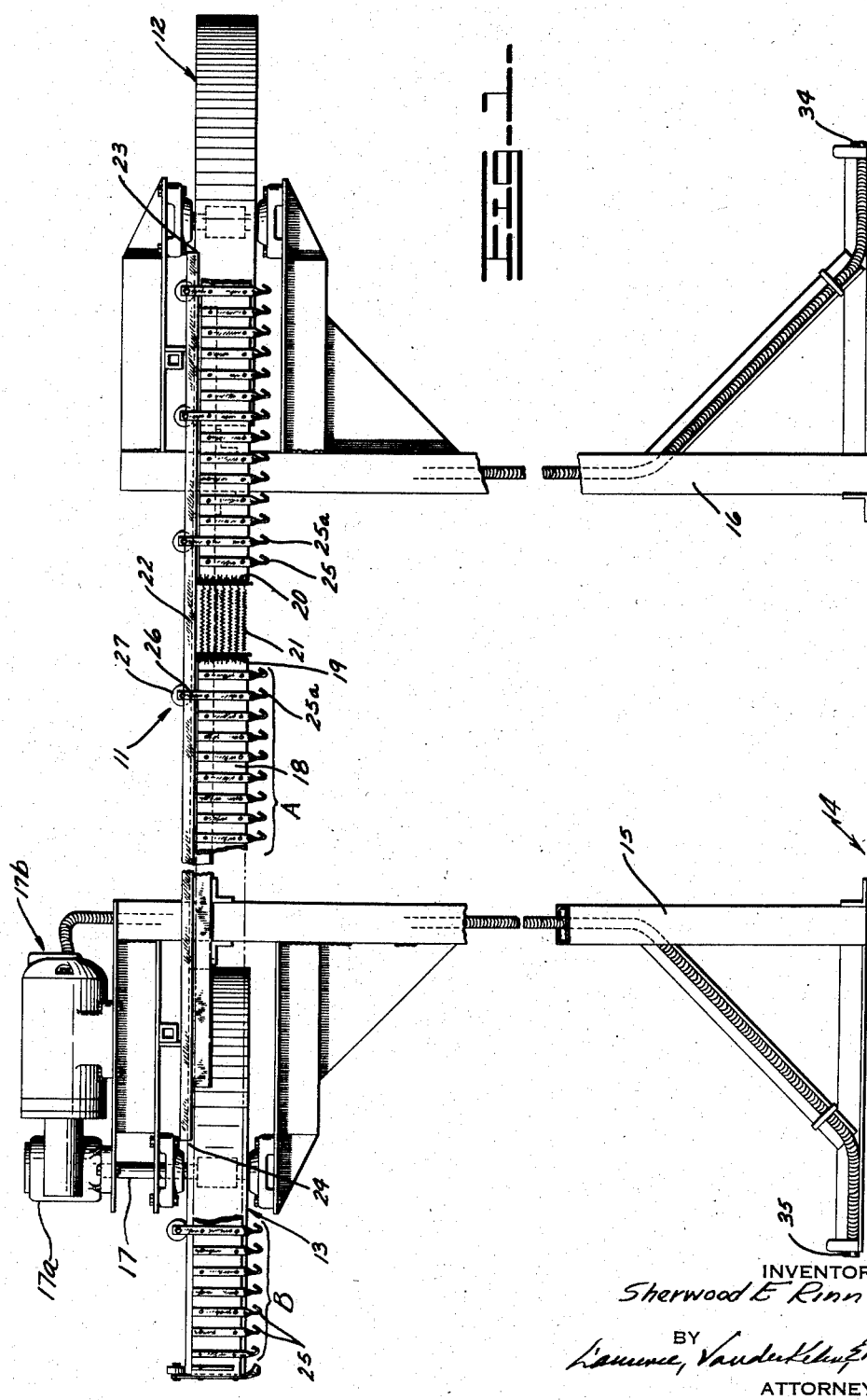
INVENTOR
Sherwood E. Rinn
BY
ATTORNEY Jan. 27, 1959 S. E. RINN 2,870,901
CALL SERVICE CONVEYOR
Filed Dec. 19, 1955 2 Sheets-Sheet 2
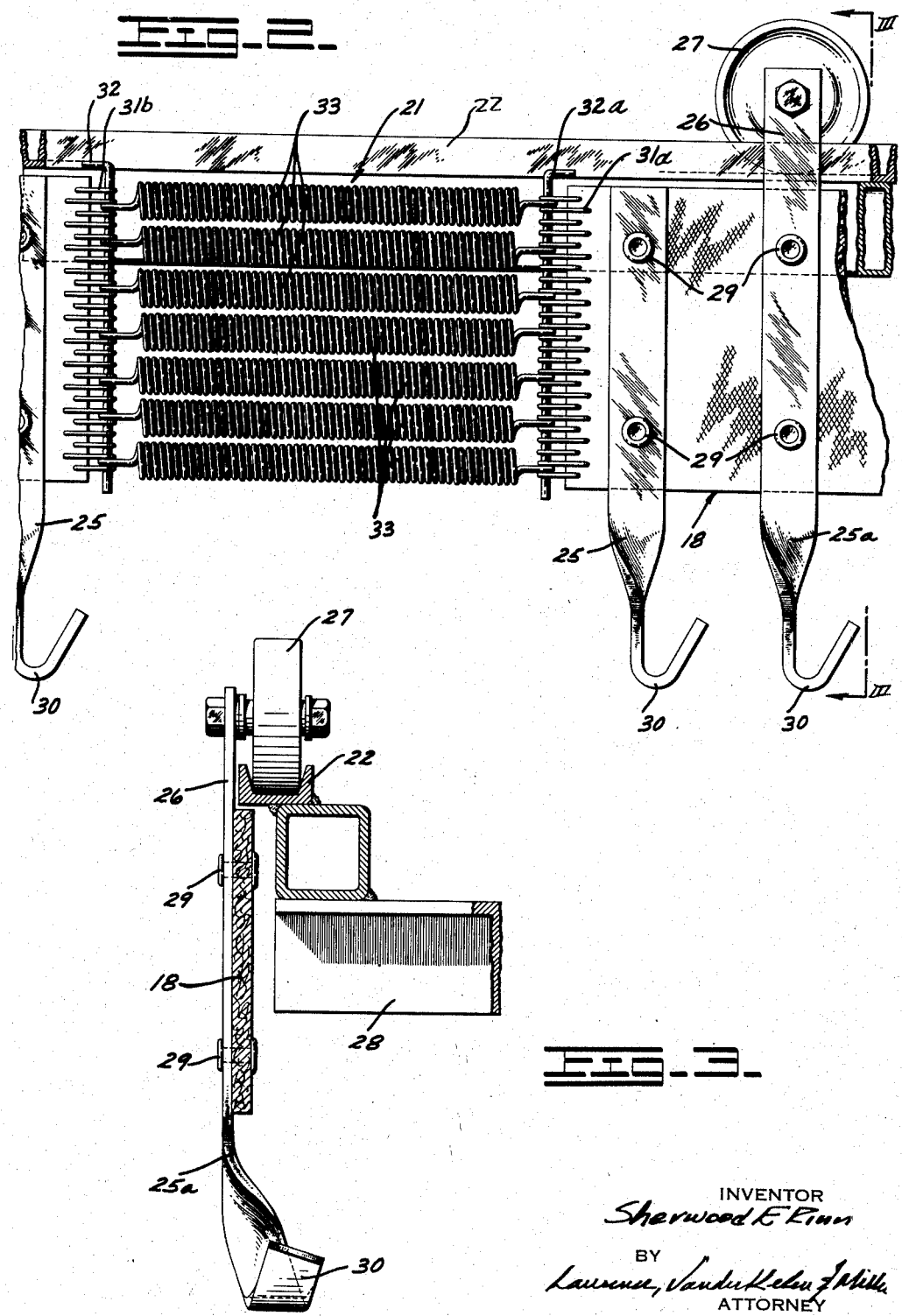
INVENTOR
Sherwood E. Rinn
BY
Laurence, VanderKelen & Miller
ATTORNEY

2,870,901

CALL SERVICE CONVEYOR

Sherwood E. Rinn, Lapeer, Mich.

Application December 19, 1955, Serial No. 554,049

6 Claims. (Cl. 198—177)

The present invention relates to conveyors and is more particularly concerned with semi-portable call service conveyors for industrial establishments.

A major problem confronting industries employing conveyors, is for example, the handling and distribution of finished product, parts and assemblies to the next station in quantities for instant use and ease of handling. In the dry cleaning establishments, for example, the present day storage systems of finished clothing requires repeated handling under conditions which permit dirt and dust to readily collect even though extensive precautions are taken to prevent this occurrence. The clothes, normally stored on cumbersome and space wasting pipe racks, require careful and tedious storing and handling to insure that wrinkles, folds or creases are not pressed into the fabric while the hanging garments are awaiting pick-up by the customer. Conveyor systems, having floating hangers to accommodate various size bundles, have been employed with little or no widespread commercial success. Grease and oil from these systems spot and soil the finished clothes. The known conveyor systems are generally noisy, expensive to install and require constant skilled technical attention.

In industrial establishments other than the dry cleaning establishments conveyors have been extensively used. However, portable or semi-portable powered conveyors have enjoyed only limited use because, until now, they have always been cumbersome to handle and unstable for most factory assembly line needs. Further, most portable or semi-portable conveyors require some structural tie-in with the building or other conveyor systems. This structure tie-in has primarily been due to conveyor stability requirements heretofore thought necessary to support the motor, drive wheels, sprockets and chains to drive the carriers and the large motors thought necessary to insure positive movement under heavy load. Further, positive drive means, exacting tension, reduced stretch and long wear-life necessary for commercial usage have been intimately associated with chain drive conveyors. Portable-driven conveyors have been subject to many prejudices in industry because of their heretofore relative inflexibility, high expense and high standard of skill required to be employed to install, set up and maintain even small portable conveyors.

It is therefore an object of the present invention to provide a call service conveyor for dry cleaning establishments for example which does not require the use of oil or grease near the belt or objects carried thereby.

A further object of the present invention is to provide a call system for clothes handling which will expedite delivery and permit rapid discharge and handling of the finished clothes at the discharge station.

It is a further object of the present invention to provide a substantially noiseless semi-portable conveyor system which can be used in a business establishment customer call office.

Another object of the present invention is to provide a call service conveyor system which can be expanded or altered to meet the demands of business and which expansion is of repetitive standard construction, economical to make and easily installed by unskilled labor.

A still further object of the present invention is to provide a call service conveyor system which has constant belt-tension self-compensating for increased load and stretch of the conveyor belt.

A further object of the present invention is to eliminate the necessity of alphabetical arrangement of the garments on racks, hooks or conveyors and yet allows quick and accurate delivery of the desired garment to the station.

A still further object of the present invention is to provide a semi-portable conveyor system which is convertible to top or bottom load carrying.

Another object of the present invention is to provide a semi-portable conveyor system wherein there is no frictional engagement between the articles being carried as they travel about the conveyor.

In the drawing:

Figure 1 is a partial perspective view in side elevation of the call service conveyor system in the present invention.

Figure 2 is a front elevation view of belt tensioning device.

Figure 3 is an end elevation view of belt hanger hooks and extending idler wheels, track and track support.

*General description*

The present invention comprises a call service conveyor system having a resilient endless belt mounted for movement about two horizontally positioned spaced apart wheels and movement by one of said wheels. The upper surfaces of the wheels are aligned to form the curved sections of a continuous track-like surface by mating substantially tangentially with a pair of parallel tracks which are spaced apart from each other between the two horizontally spaced apart wheels at substantially the diameter of the wheels. Secured to the belt, at regular intervals along the belt for movement with the belt are material carriers. At regular intervals the carriers are modified to provide a body portion above the upper belt edge to operatively carry an idler or roller which rides on the parallel tracks and upper surface of the wheels as the belt is moved about its course. In one embodiment of the invention, a call service conveyor for dry cleaning establishments, the material carriers are provided with hanger hooks depending below the belt lower edge. The hooks preferably are bent at right angles to the direction of travel of the belt about the track. This angle of approach is necessary in this embodiment so that clothes hangers or the like hung on the hooked material carriers will assume a position right angular to the direction of travel of the belt permitting maximum clearance between bundles on the hangers.

The resilient belt is a self-compensating tensioning means and, in the preferred embodiment, the resiliency is achieved by a series of resilient tensioning means between and joining the ends of the belt. A motor, operatively mounted to provide driving power through a reduction gear box is positioned above one of the wheels. The belt, through the frictional engagement with the wheel, is thus driven. The entire assembly is mounted on and to frames generally comprising a plurality of T and F struts to support the parallel belt tracks and the wheels and thus support or carry the belt and associated rollers and carriers above the floor or datum plane.

*Specific description*

Reference being had to the accompanying drawings, the present invention, in one embodiment shown in Figure 1 comprises a call service conveyor system 11 for use in a dry cleaning establishment, having a pair of spaced apart wheels 12 and 13 which wheels are positioned horizontally above a base line or datum plane 14. The wheels 12 and 13 are cast aluminum in the preferred embodiment, but may be constructed from steel, iron or any other suitable material. The wheels 12 and 13 are provided with wide rims 23 and 24. The outer peripheral faces of rims 23 and 24 engage the belt 18. As shown in Figure 1, the wheels 12 and 13 are mounted horizontally on frame members 15 and 16, the axis of the wheels 12 and 13 are therefore in a vertical position. Each wheel, 12 or 13, is supported above the base line 14 by an F-stand frame member 15 and 16, respectively. One of the said wheels 12 and 13, for example, wheel 13, is connected by its shaft 17 to a reduction box 17a. The reduction box 17a is in turn connected to a source of power 17b which will impart through the shafting 17 and gear box 17a a rotatable movement to the wheel 13. Mounted on and in frictional engagement with the said pair of spaced apart wheels 12 and 13 in a motion following manner is a resilient endless belt 18 having its ends 19 and 20 secured one to the other by self compensating tensioning means 21. The self-compensating means 21 is, in the preferred embodiment, a convolute tensioning device 21 of the design shown in Figure 2. The ends 19 and 20 of the belt 18 have the eyelets 31a and 31b. Positioned through each series of eyelets 31a and 31b, respectively, is a lacing pin 32 and 32a. Several convolute springs 33 are attached to the belt lacing pins 32 and 32a joining the belt ends 19 and 20 thereby providing a constant tensioning self-compensating end closure means between the ends of the belt 18. Mounted between each of said wheels 12 and 13 in a parallel pattern to said belt 18 substantially mating with the perimeters of the spaced apart wheels 12 and 13 are two parallel tracks 22. The pair of parallel tracks 22 is supported above the base line 14 by T-structure frame members or supports 28. The tracks 22 are so positioned as to have their upper planar surfaces tangential to the upper horizontal surfaces and outer rims 23 and 24 of the wheels 12 and 13, respectively, thus forming a continuous horizontal closed circuit track-like surface. The upper edge of the rims of the wheels 12 and 13 form a horizontal circular surface upon which the rollers 27 travel after leaving and before entering the tracks 22. The tracks 22 and wheels 12 and 13 are positioned so as to maintain the rollers 27 at the same height throughout their course of travel. Securely spacedly mounted on the endless belt 18, for movement with the belt are a series of carriers 25. At regular intervals the carriers 25 are modified as shown in Figure 1. The modified carriers 25a are provided with an extension 26 above the belt 18. The extension 26 is adapted to operatively carry an idler roller 27 rotatably mounted to said extended portion 26 of said carriers 25a. The roller 27 is positioned to ride in and on the tracks 22 above the belt and on and around the upper horizontal wheel rims 23 and 24.

The carriers 25 and modified carriers 25a are secured to the belt 18 by means of, for example, rivets 29 in fixed spaced relationship one to the other. The carriers in one embodiment, as shown in Figure 1, have their ends below the belt terminating in hooks 30 which turn at an angle of preferably about 90 degrees to the direction of travel of the belt 18 to provide right angular approach to the direction of travel of the belt 18 of a clothes hanger (not shown) hung on and carried by hook 30.

The structure above described is a preferred embodiment of the conveyor of the present invention for use in dry cleaning establishments. Various modifications can be made in the method of loading and the angle of approach when the conveyor is used in other industries. However, in the dry cleaning industry the angle of approach of the garment being carried by the conveyor carrier is critical. The angle must be, for this industry between about 87 and 92 degrees and preferably about 90 degrees. This angle is critical in the dry cleaning industry because departure therefrom will cause large bundles of clothing on hooks 30 to rub against the next bundle causing wrinkling of the bags and clothing. Further, when the angle is less or greater than 90 degrees the operation of loading and unloading is hindered and slowed because the operators must use both hands to spread apart the adjoining bags and must insert or extract the new bundle angularly into and out the space in order to place or remove the desired bag. When the bags move on a conveyor where the angle of approach is greater or less than 90 degrees, the bags tend to shift inwardly and outwardly of the line of travel. The bags will brush and rub the center stanchions or T struts 28 supporting the tracks 22 of the conveyor. The design of the present invention with the right angular approach remedies these bothersome and inconvenient objections in the dry cleaning industry.

Modification of the belt carriers 25 and 25a can be made so as to allow a top load carrying conveyor. Thus, if the industry requires a basket or palate to be used to carry parts or other items from a loading point to a delivery point the carriers can all be modified to carriers 25a each with an extension 26 above the upper edge of belt 18. The palate or basket is then secured to the extension 26 above the roller 27. Depending upon the weight to be carried the extensions 26 may each be provided with a roller 27 to support the weight and reduce the bearing load on the belt. The load carried in a basket or palate may be evenly balanced above the belt on the hangers and no obstructions hinder this modification. Further, a bracket, wide spread to form a moving surface, can be attached to the carriers and the surface will traverse the course of the track providing a continuous moving surface.

The roller modified carriers 25a have been shown as being placed every 7 and 8th carrier, it is to be understood that depending upon the designed weight they may occur more often than shown at A and B of Figure 1 or less frequent if the load is light. Thus, every carrier may be so modified if the load weight is great. This is partciularly true where the use of a continuous moving surface is employed and top bearing loads are employed.

To turn corners the wheels 12 and 13 need merely to be placed so the belt will ride face to the wheel. Support for the belt short turns is not normally necessary but where support is necessary because of heavy loads the tracks 22 can be turned to the circumference of the wheel and the rollers 27 will ride on the so curved track bearing against the wheel giving accurate and stable travel around a corner. It will be appreciated that very sharp corners can be smoothly traversed reducing to a minimum space normally necessary to turn corners. In the dry cleaning industry, for example the wheel diameter for a 180 degree turn is exactly the same as the wheels 12 and 13 of design shown in Figure 1 thus providing the identical clearance between rows as would be provided in the single circuit unit shown in the drawings. It will also be appreciated that the length of the unit may be extended to accommodate special conditions.

The motor 17b is preferably connected to the shafting of the wheel 12 by the use of a flexible link belt connector (not shown). It is to be understood that any conventional means may be used to perform this function such as Teflon couplers, rubber flexible couplers and the like. The desirability of continuous semi-portable conveyors which will turn corners and can be altered quickly and cheaply thus has been achieved.

*Installation and operation*

The conveyor system is preferably installed in the manner shown in Figure 1. The F-shaped frame members 15 and 16 are placed on the floor 14 and are spaced apart at an interval such as to enable the belt 18 to be tightly stretched over the wheels 12 and 13. The F stands are not bolted or otherwise secured to the floor but are leveled by use of leveling screws (not shown) in the manner normally used when leveling by these well known screws. The wheels 12 and 13 are placed on the F struts 15 and 16 and the intermediate T frames 28 as necessary are positioned to support the parallel tracks 22 adjacent and tangentially in line with the circumference of the wheels 12 and 13 to span the space therebetween. The belt 18 having the carriers 25 and modified carriers 25a is placed over the wheels 12 and 13 so that the idlers 27 ride on the tracks 22 and the wheel rims 24 and 23. The motor 17b or other similar power supply is mounted on one F strut 15, for example, and geared through reduction box 17a to the wheel shaft 17 to rotate the wheel 12 when power is supplied to the motor. The controls for the motor are carried to two floor switch stations 34 and 35 in any convenient manner. The floor switches may be foot pedals 34 and 35, as shown in Figure 1, or buttons or other similar control means. The illustrated system has two stations 34 and 35 set up for control, one for loading and one for unloading, in the manner shown in Figure 1. The loading and unloading is preferably done at the ends since the right angular approach of the carriers provides maximum spacing between items on the carriers at this point due to the greater circumference at the outside of the items than that at the carrier as the belt travels about the wheels. The hooks 30, as for example in the embodiment shown in Figure 1, are numbered consecutively to enable an operator to bring to the station the desired hook having the desired item as, for example, clothing, called for. The loader numbers the bill with the hook number and the bill is sent to the unloading or call station. The attendant at the call station files the bill numerically by bill number or alphabetically which ever is most convenient. When the customer calls for the garment the operator merely matches the customer's bill number or name, with that in his file (both must match), and thus obtains the hook number. Having this, the operator steps on the foot pedal to energize the motor causing the belt to revolve about the wheels until the desired numbered hook comes to the unloading station. The operator releases the switch which de-energizes the motor and causes the belt to stop. The garment is thus expeditiously and easily brought to the station for delivery to the customer. No overrun switch is normally required because the belt travels only at a rate of about one foot per second. Where more rapid speeds are required magnetic brakes of conventional design can be installed on wheel shafts or motor armature to brake the travel of the belt and bring it to a smooth non-jolting stop when motor power is shut off.

If two operators are unloading garments the first to operate causes the belt to rotate to bring about the desired numbered hook. The second operator has only to watch for her number to come by the end of the system. When this happens she merely lifts the garment from the hook. The spacing at the end of the conveyor as the garments traverse the wheel causes the garments to open at the outside fanlike thus facilitating easy and quick removal by an operator even when the belt is moving.

The materials of construction of the various elements are preferably of materials of light weight, high strength and good durability such as aluminum and aluminum alloys, plastics such as nylon, Teflon and the like, having high tensile strengths and alloy steels such as stainless steel are particularly suitable. The weight necessary to hold the conveyor system to the floor is realized by the weight of the material being carried. The design permits light weight construction having the required rigidity for service yet easily moved to new locations.

I claim:

1. A semi-portable endless conveyor comprising: a pair of spaced apart wheels horizontally positioned and supported above a datum plane, each of said wheels having a wide outer peripheral belt engaging surface; a pair of parallel tracks spaced apart substantially the diameter of said wheels and aligned with the upper and outer surfaces of said wheels; a broad face friction belt having material carrying supports fixedly and spacedly secured therealong, said belt mounted for movement around said spaced apart wheels in endless manner some of said carrying supports having a portion extending above said belt and said extensions being provided with rollers to ride in and on said tracks and on and around the upper rim of said wheels; a source of power connected to one of said wheels to drive said one wheel and a control station remote from said motor to control said power source.

2. A semi-portable endless conveyor substantially as set forth in claim 1 wherein said endless belt is resiliently joined at its ends.

3. An endless conveyor comprising: a driven wheel having a wide outer peripheral belt engaging surface horizontally positioned above a datum plane; a second wheel having a wide outer peripheral belt engaging surface horizontally positioned above said datum plane substantially on the same plane as said first wheel and horizontally spaced apart therefrom in idling relation to said first wheel; a pair of parallel spaced apart tracks forming, with the upper horizontal surface of said wheels, a substantially continuous track-like surface; a broad face friction belt positioned on said wheels for rotation therewith having its ends resiliently joined by tensioning means; a series of material carriers fixedly spacedly secured to said belt for movement with said belt, at regular intervals said hooks having an upwardly extending member provided with a rotatably mounted roller member riding on said tracks and the upper surface of said wheels providing support for said belt and carriers; and a source of rotary power to drive said driven wheel.

4. A conveyor system comprising: a pair of portable frame members; a driven wheel mounted on one of said frames; an idler wheel mounted on the other of said frames; a pair of spaced apart parallel tracks intermediate said wheels and substantially tangential thereto supported by intermediate frames; a resilient endless belt frictionally engaging the peripheral face of the rims of said wheels and driven by said driven wheel; carriers spacedly attached to the outer face of said belt; rollers spacedly attached at intervals to selected of said carriers and riding on said tracks and the upper edge of the rims of said wheels, and driving means on said frame drivably connected to the driven wheel.

5. A conveyor system comprising: a pair of portable frame members; a driven wheel mounted on one of said frames; an idler wheel mounted on the other of said frames; a pair of spaced apart parallel tracks intermediate thereto; a resilient endless belt frictionally engaging the peripheral face of the rims of said wheels and driven by said driven wheel; carriers spacedly attached to the outer face of said belt; rollers spacedly attached at intervals to selected of said carriers and riding on said tracks and the upper edge of the rims of said wheels and driving means on said frame drivably connected to the driven wheels and a control element remote from said driving means to control power to said driving means.

6. A conveyor system comprising: a pair of portable frame members; a driven wheel mounted on one of said frames; an idler wheel mounted on the other of said frames; a pair of spaced apart parallel tracks intermediate said wheels, substantially tangential thereto supported by intermediate frames; and endless belt frictionally engaging the peripheral face of the rim of said wheels and driven by said driven wheel; said belt joined at its ends by a resiliently tensioned segment; carriers spacedly attached to the outer face of said belt; rollers spacedly attached at intervals to selected of said carriers; said rollers riding on said tracks and the upper edge of the rims of said wheels, and driving means on said frame drivably connected to the driven wheel.

References Cited in the file of this patent

UNITED STATES PATENTS

| | | |
|---|---|---|
| 1,228,429 | Griffin | June 5, 1917 |
| 2,587,053 | Lopez | Feb. 26, 1952 |
| 2,678,718 | Black | May 18, 1954 |
| 2,778,504 | Byrne | Jan. 22, 1957 |